Patented Aug. 22, 1933

1,924,073

UNITED STATES PATENT OFFICE 1,924,073

STABLE AMMONIUM SALT OF PRIMULA SAPONINE

Helmut Legerlotz, Berlin-Friedenau, Germany, assignor to P. Beiersdorf & Co. Inc., New York, N. Y.

No Drawing. Application November 17, 1932, Serial No. 643,125, and in Germany January 19, 1928

6 Claims. (Cl. 260—25)

This invention relates to the manufacture of a valuable ammonium salt of primula saponine and has for its main object the manufacture of stable and valuable salts of primula saponine suitable for therapeutic purposes especially as an expectorant or a constituent of expectorant compositions.

Plants of the primula species contain a saponine, which is insoluble in water and may be recovered by extraction of vegetable primula drugs, especially radix primula. The acid character of this saponine is known, as sodium and potassium salts of primula saponine have already been prepared.

I have now ascertained that the primula saponine is a comparatively strong acid and forms a well defined and stable salt also with ammonia, said salt being of high therapeutic value.

Example 10 kg. of radix primulæ are extracted with 50 kg. of 96% alcohol. The alcoholic solution is concentrated by evaporation until 18 kg. of concentrate are obtained. To the hot concentrate is added aqueous ammonia in such amounts, that the reaction is distinctively alkaline. On cooling the ammonium salt of primula saponine precipitates, which is separated from the liquid and purified by repeated recrystallization in diluted alcohol and treatment with charcoal. The white and pure salt melts at 212 to 213° C. a strong foaming up taking place during the melting. The salt is easily soluble in water and yields ammonia by boiling it with sodium hydroxide solution. The ammonia content of the salt is 1,36%.

The foregoing detailed example has been given for clearness of understanding only, and no unnecessary limitations should be understood therefrom, but the appended claims should be construed as broadly as permissible in view of the prior art.

I claim:

1. An ammonium salt of primula saponine being a white substance soluble in water and melting at 212 to 213° C.

2. A method for making an ammonium salt of primula saponine which consists in neutralizing primula saponine with ammonia.

3. A method for making an ammonium salt of primula saponine which consists in neutralizing with ammonia extracts of vegetable drugs containing primula saponine, recovering the ammonia salt formed and purifying it by recrystallization.

4. A method for making an ammonium salt of primula saponine which consists in neutralizing with ammonia alcoholic extracts of vegetable drugs containing primula saponine, recovering the ammonium salt formed and purifying it by recrystallization.

5. A method for making an ammonium salt of primula saponine which consists in neutralizing with ammonia alcoholic extracts of radix primula, recovering the ammonium salt formed and purifying it by recrystallization.

6. A method for making an ammonium salt of primula saponine which consists in neutralizing with ammonia alcoholic extracts of radix primula, recovering the ammonium salt formed and purifying it by recrystallization from aqueous alcohol.

HELMUT LEGERLOTZ.